No. 612,915. Patented Oct. 25, 1898.
P. R. SCHUBERT & A. STELZENMÜLLER.
SUPPORTING TABLE FOR MACHINE TOOLS.
(Application filed Dec. 23, 1897.)
(No Model.) 2 Sheets—Sheet 1.

Witnesses:
Alfred Meister
Heinrich Neubert

Inventors:
Paul Richard Schubert &
Andreas Stelzenmüller
by Eustace W. Hopkins
Att'y No. 612,915. Patented Oct. 25, 1898.
P. R. SCHUBERT & A. STELZENMÜLLER.
SUPPORTING TABLE FOR MACHINE TOOLS.
(Application filed Dec. 23, 1897.)

(No Model.) 2 Sheets—Sheet 2.

Witnesses:—
Alfred Meister
Heinrich Neubart

Inventors:—
Paul Richard Schubert &
Andreas Stelzenmüller
by Eustace W. Hopkins
Att'y

UNITED STATES PATENT OFFICE.

PAUL RICHARD SCHUBERT AND ANDREAS STELZENMÜLLER, OF CHEMNITZ, GERMANY.

SUPPORTING-TABLE FOR MACHINE-TOOLS.

SPECIFICATION forming part of Letters Patent No. 612,915, dated October 25, 1898.

Application filed December 23, 1897. Serial No. 663,240. (No model.)

*To all whom it may concern:*

Be it known that we, PAUL RICHARD SCHUBERT, a subject of the King of Saxony, and ANDREAS STELZENMÜLLER, a subject of the King of Würtemberg, residents of Chemnitz, in the Kingdom of Saxony, German Empire, have invented certain new and useful Improvements Relating to Supporting-Tables for Machine-Tools, of which the following is a full, clear, and exact description.

The object of the present invention is to provide a work-holding table or support for drilling, shaping, and cutting machines which is adjustable in five ways; and the invention consists of the details of construction hereinafter set forth, and particularly described in the claim.

In order to render the present specification more easily intelligible, reference is had to the accompanying drawings, in which similar letters of reference denote similar parts throughout the several views.

Figure 1:
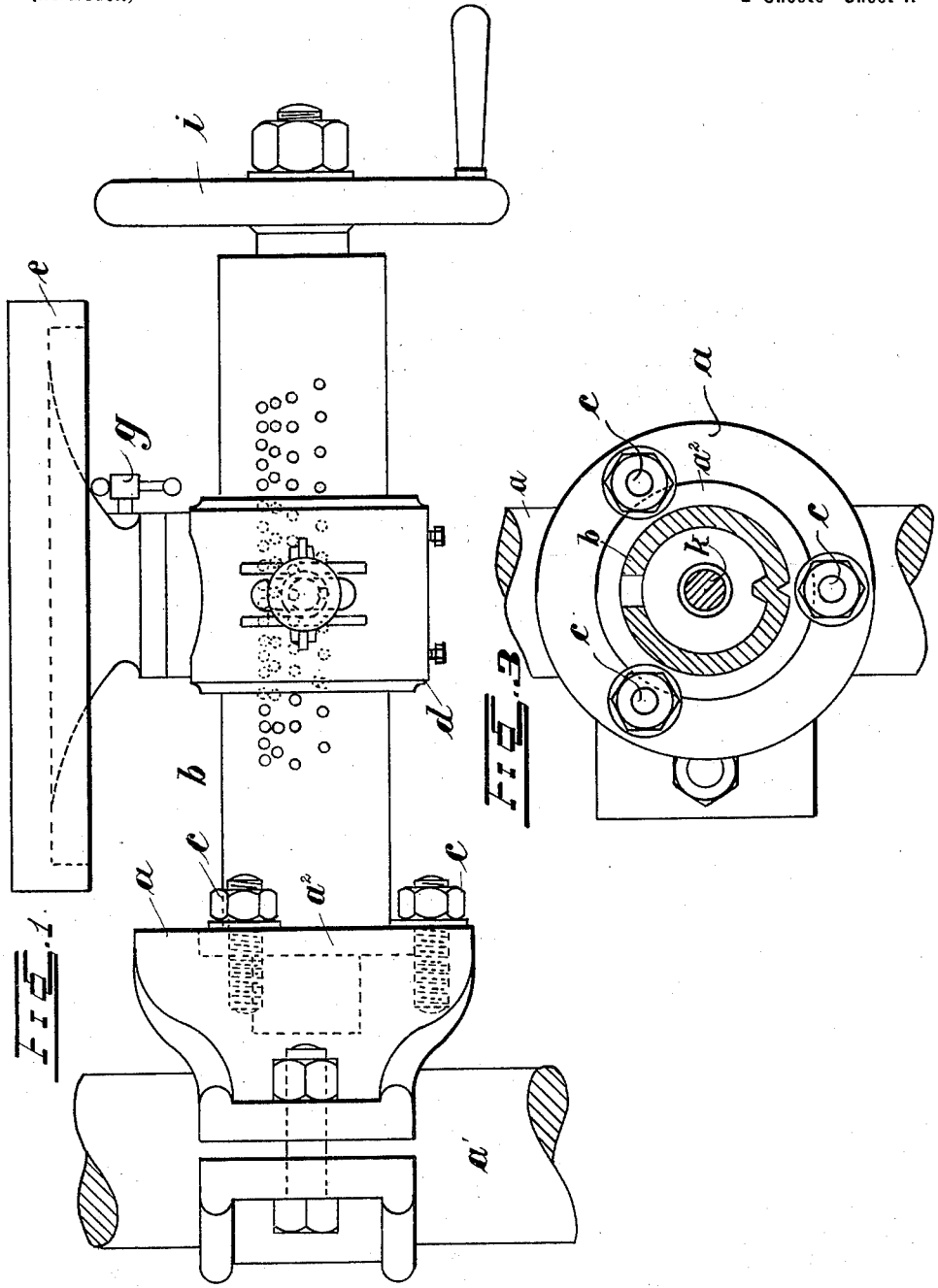
Figure 2:
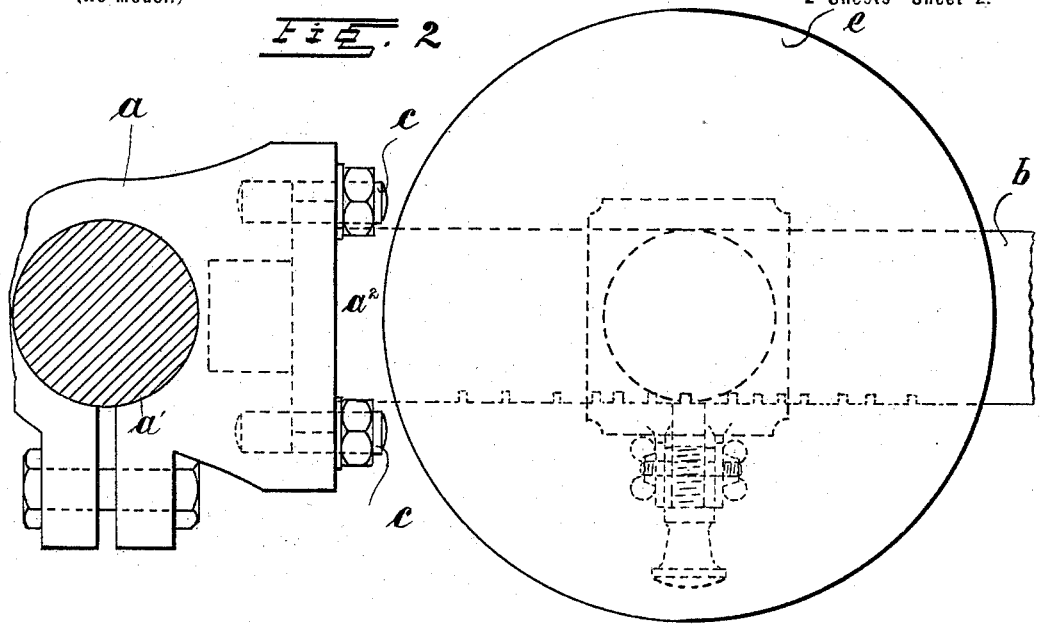
Figure 4:
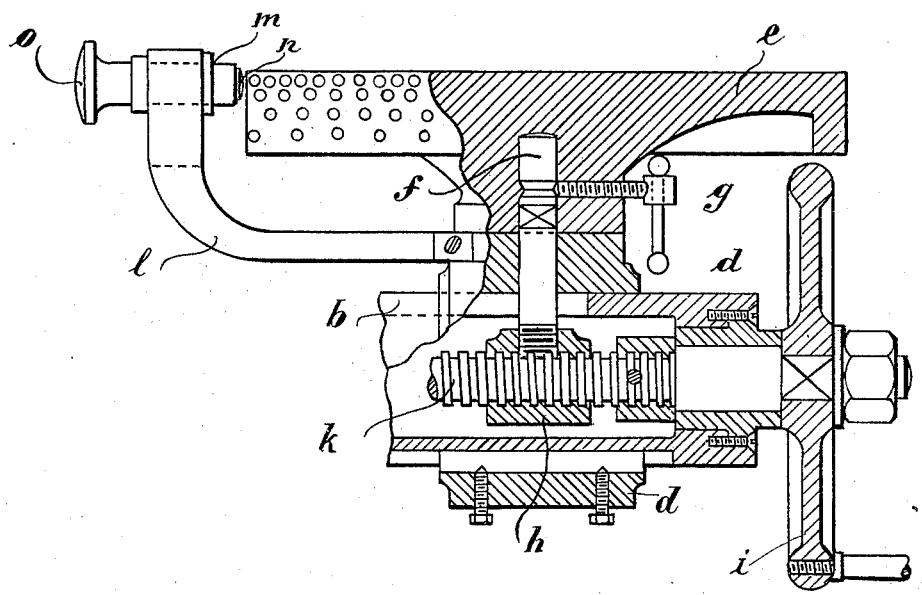

Figure 1 is a side elevation, Fig. 2 a plan, Fig. 3 an end elevation, and Fig. 4 a vertical central section, partly in elevation, of one form of embodying the invention.

An adjustable clamping-sleeve $a$ is adapted to be vertically adjusted on the column $a'$, and to this clamping-sleeve is attached a horizontal bar $b$ by any suitable means, such as a flange and studs $c\ c$ or the like. This bar is hollow and provided with a slot along its upper side through which a stud $f$, Fig. 4, projects upwardly. This stud is screwed into a nut $h$, adjustable on a horizontal screw-spindle $k$, mounted in suitable bearings in the hollow bar $b$. The said screw-spindle is provided with a hand-wheel by means of which the nut, and with the same the stud $f$, may be horizontally adjusted on the spindle.

A collar $d$ fits conveniently around the bar $b$ and has an upper horizontal disk formed thereon, on which fits a lower disk of a rotary table $e$, said table being centered on the stud $f$ and adjustable thereon in any desired position by means of a clamping-screw $g$ with handle-bar, which screw fits or engages with its end in an annular recess in the said stud $f$. The screw-spindle $k$ may be turned by means of the hand-wheel $i$.

In order to adjust the table or support $e$ to any desired position, several series of holes are provided around its periphery, as shown at Fig. 4, and an arm $l$ is mounted on the collar $d$, extending outwardly and being turned upwardly, so as to support in its upward end a spring-bolt $n$, said bolt $n$ being carried by a sleeve $m$, which is vertically adjustable in the end of said arm $l$, any suitable means being employed to adjust the said sleeve vertically. Thus, for instance, notches may be made in the arm into which the pin of the movable part of the detent-bolt $m\ n$ engages.

The bolt $n$ is horizontally movable within the sleeve and is normally held in engagement with one or other of the holes in the table-disk by means of a spiral spring. (Not shown in the drawings, but arranged in the ordinary well-known manner.) When the head $o$ of the detent-bolt $n$ is drawn back by hand, the forward end of the same will be disengaged from the orifices of the disk, and on releasing the bolt the same will be actuated forward by means of its spring and engage the hole opposite its advancing end. A similar detent arrangement is formed on the hollow bar $b$, as clearly shown at Figs. 1 and 2. The same arrangement may also be applied in connection with the clamping-sleeve $a$, if desired.

The rows of holes in the edge of the disk are arranged so that the upper row are closest together, the next row below having holes somewhat wider apart, and so on, the holes of the lowest row being farthest apart.

From the above description it will be seen that the table or support may be adjusted in five ways—first, vertically on the column $a'$; second, horizontally along the hollow bar $b$; third, around the said bar $b$; fourth, on its own central pivot, and, fifth, around the column $a'$.

The bar $b$ is revolubly mounted in the clamp $a$, said bar having a flange $a^2$, over which washers of the stud $c$ grip. By loosening the said studs the bar may be turned and then tightened in any desired position. A pointer and scale may be provided on the parts $a$ and $a^2$, from which the degree of adjustment may be read off.

We claim as our invention—

The combination of a vertical column, a clamping-sleeve adjustable thereon, a hollow bar rotatably mounted and means for adjusting the same on said clamp, a slot along the hollow bar, a screw-spindle revolubly mounted within the same and means for rotating the same, a nut to travel on said spindle having upwardly-extending stud, a table revolubly mounted on said stud and means for clamping the same in position thereon, and means for adjusting the said table consisting of an arm $l$ on the said collar having a horizontal spring-pressed bolt at its end and a series of holes arranged as specified into one of which said bolt may engage and means for adjusting said bolt vertically in the end of the arm substantially as described.

In testimony whereof we have signed our names to this specification in the presence of two subscribing witnesses.

PAUL RICHARD SCHUBERT.
  ANDREAS STELZENMÜLLER.

Witnesses:
 PAUL FABIAN,
 EUGEN NABEL.